United States Patent
Yang et al.

(10) Patent No.: US 11,526,971 B2
(45) Date of Patent: Dec. 13, 2022

(54) METHOD FOR TRANSLATING IMAGE AND METHOD FOR TRAINING IMAGE TRANSLATION MODEL

(71) Applicant: BEIJING BAIDU NETCOM SCIENCE AND TECHNOLOGY CO., LTD., Beijing (CN)

(72) Inventors: Shaoxiong Yang, Beijing (CN); Chen Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 17/107,196

(22) Filed: Nov. 30, 2020

(65) Prior Publication Data

US 2021/0374924 A1 Dec. 2, 2021

(30) Foreign Application Priority Data

Jun. 1, 2020 (CN) .............................. 202010484274

(51) Int. Cl.
*G06T 5/50* (2006.01)
*G06F 17/18* (2006.01)

(52) U.S. Cl.
CPC ................ *G06T 5/50* (2013.01); *G06F 17/18* (2013.01); *G06T 2207/20076* (2013.01); *G06T 2207/20081* (2013.01)

(58) Field of Classification Search
CPC ............. G06T 5/50; G06T 2207/20076; G06T 2207/20081; G06T 3/0093; G06T 2207/20221; G06T 2207/30201; G06F 17/18; G06V 40/16
See application file for complete search history.

(56) References Cited

U.S. PATENT DOCUMENTS

| | | | |
|---|---|---|---|
| 11,017,560 B1* | 5/2021 | Gafni | G06T 7/73 |
| 11,120,526 B1* | 9/2021 | Demyanov | G06T 5/001 |
| 2018/0247201 A1 | 8/2018 | Liu et al. | |
| 2019/0012904 A1* | 1/2019 | Yusuf | G08B 17/06 |
| 2019/0197670 A1* | 6/2019 | Ferrer | G06K 9/6272 |
| 2019/0251401 A1* | 8/2019 | Shechtman | G06V 20/20 |
| 2019/0282208 A1* | 9/2019 | Silberman | A61B 8/468 |
| 2019/0295302 A1* | 9/2019 | Fu | G06N 3/088 |
| 2020/0311874 A1* | 10/2020 | Ye | G06T 5/001 |

(Continued)

OTHER PUBLICATIONS

Han, X., et al., "VITON: An Image-based Virtual Try-on Network," arXiv:1711.08447v4 [cs.CV] Jun. 12, 2018.*

(Continued)

*Primary Examiner* — Xuemei G Chen
(74) *Attorney, Agent, or Firm* — Lathrop GPM LLP

(57) ABSTRACT

The present disclosure provides a computer-implemented method for translating an image and a computer-implemented method for training an image translation model. In the computer-implemented method for translating an image, an image translation request carrying an original image is obtained. The original image is processed to generate a pre-translated image, a mask image and a deformation parameter. The original image is deformed based on the deformation parameter to obtain a deformed image. The deformed image, the pre-translated image and the mask image are merged to generate a target translated image.

9 Claims, 9 Drawing Sheets

(56) References Cited

U.S. PATENT DOCUMENTS

| | | | | |
|---|---|---|---|---|
| 2021/0312243 | A1* | 10/2021 | Wang | G06K 9/6271 |
| 2021/0326372 | A1* | 10/2021 | Ramachandra | G11B 27/34 |
| 2021/0365736 | A1* | 11/2021 | Kearney | G06T 5/002 |
| 2021/0383154 | A1* | 12/2021 | Li | G06T 7/90 |
| 2021/0383242 | A1* | 12/2021 | Ostyakov | G06V 30/194 |
| 2021/0397889 | A1* | 12/2021 | Gong | G06V 40/168 |
| 2022/0005584 | A1* | 1/2022 | Takahashi | G06V 10/454 |
| 2022/0012846 | A1* | 1/2022 | Dorta | G06T 3/0093 |
| 2022/0028031 | A1* | 1/2022 | Sun | G06T 3/0012 |
| 2022/0036564 | A1* | 2/2022 | Ye | G06T 7/0014 |
| 2022/0044074 | A1* | 2/2022 | Li | G06T 5/50 |
| 2022/0044352 | A1* | 2/2022 | Liao | G06T 3/0012 |

OTHER PUBLICATIONS

European Patent Application No. 21150145.7 extended Search and Opinion dated May 7, 2021, 8 pages.
Sangwoo, M. et al. "InstaGAN: Instance-aware Image-to-Image Translation" Dec. 28, 2018, 26 pages.
Gokaslan, A. et al. "Improving Shape Deformation in Unsupervised Image-to-Image Translation" Oct. 6, 2018, pp. 662-678.
Shao, Z. et al. "Remote Sensing Image Fusion With Deep Convolutional Neural Network" IEEE Journal of Selected Topics in Applied Earth Observations and Remote Sensing, vol. 11, No. 5, May 1, 2018, pp. 1656-1669.

\* cited by examiner

METHOD FOR TRANSLATING IMAGE AND METHOD FOR TRAINING IMAGE TRANSLATION MODEL

CROSS REFERENCE TO RELATED APPLICATIONS

This application claims priority and benefits to Chinese Application No. 202010484274.8, filed on Jun. 1, 2020, the entire content of which is incorporated herein by reference.

FIELD

The present disclosure relates to the field of image processing technologies, specifically, to the field of deep learning and image processing technologies, and more particularly, to a method for translating an image, and a method for training an image translation model.

BACKGROUND

The image translation network may directly convert one type of images into another type of images without changing the content of the image, and has a wide range of applications in image generation, scene segmentation, image stylization and other fields.

SUMMARY

Embodiments of the present disclosure provide a computer-implemented method for translating an image. The method for translating the image includes: obtaining an image translation request, in which the image translation request includes an original image; processing the original image to generate a pre-translated image, a mask image and a deformation parameter, in which the pre-translated image, the mask image and the deformation parameter correspond to the original image; deforming the original image based on the deformation parameter to obtain a deformed image; and merging the deformed image, the pre-translated image and the mask image to generate a target translated image.

Embodiments of the present disclosure provide a computer-implemented method for training an image translation model. The method for training the image translation model includes: obtaining a set of training samples, in which the set of training samples includes a set of first images belonging to a first domain and a set of second images belonging to a second domain; processing the set of first images using a first initial generator to generate a set of first pre-translated images, a set of first mask images, and a set of first deformation parameters; deforming the first images in the set of first images based on the set of first deformation parameters to obtain a set of first deformed images; merging the set of first deformed images, the set of first pre-translated images and the set of first mask images correspondingly to obtain a set of third images; inputting the set of third images into a first initial discriminator to obtain a set of first probabilities, in which each first probability indicates that a respective third image is a real image; inputting the set of second images into the first initial discriminator to obtain a set of second probabilities, in which each second probability indicates that a respective second image is a real image; and correcting, based on the set of first probabilities and the set of second probabilities, the first initial generator and the first initial discriminator to generate a first target generator belonging to the first domain, in which the first target generator belonging to the first domain is configured to translate an image in the first domain into an image in the second domain.

Embodiments of the present disclosure provide an electronic device. The electronic device includes at least one processor and a storage device communicatively connected to the at least one processor. The storage device stores an instruction executable by the at least one processor. When the instruction is executed by the at least one processor, the at least one processor is configured to implement the computer-implemented method for translating the image or the computer-implemented method for training the image translation model.

Embodiments of the present disclosure provides a non-transitory computer readable storage medium, having computer instructions stored thereon. When the computer instructions are executed by a processor, the computer-implemented method for translating the image or the computer-implemented method for training the image translation model are implemented.

It should be understood that the content described in the summary is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used for a better understanding of the solution, and do not constitute a limitation to the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

A method and an apparatus for translating an image, a method and an apparatus for training an image translation model, an electronic device, and a storage medium according to embodiments of the present disclosure are described below with reference to the accompanying drawings.

In the related art, after an image is translated through an existing method for translating images to obtain a converted image, resolution of the converted image is low, and the background of the converted image has some difference from the original image. Thus, it is difficult to achieve natural convergence and seamless merging since a visible border exists during the merging of the images. With respect to the above problems in the related art, the present disclosure provides a method for translating an image.

With the method for translating the image according to the present disclosure, an image translation request is obtained. An original image in the image translation request is processed to generate a pre-translated image, a mask image, and a deformation parameter. All of the pre-translated image, the mask image and the deformation parameter correspond to the original image. The original image is deformed based on the deformation parameter to obtain a deformed image. The deformed image, the pre-translated image and the mask image are merged to generate a target translated image. Therefore, the target translated image includes the deformed image formed from the original image, such that the target translated image makes full use of high-definition and rich high-frequency details of the original image. In this manner, not only the clarity of the target translated image is improved, but also the background of the target translated image is consistent with that of the original image. Seamless merging of images may be realized, and the naturalness of the target translated image is greatly improved.

Figure 1:
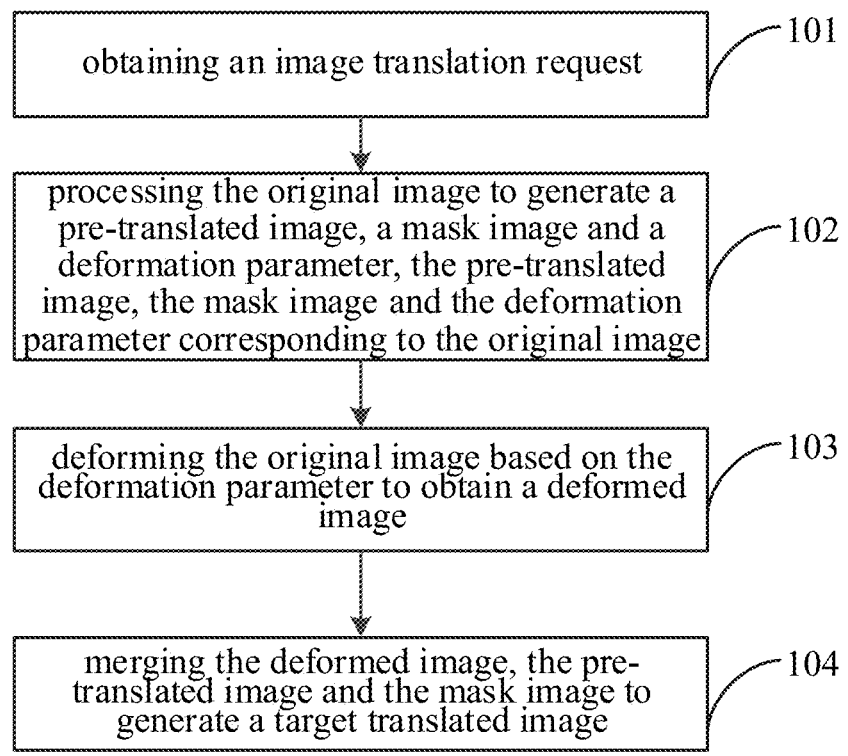
FIG. 1 is a flowchart of a method for translating an image according to embodiments of the present disclosure.

FIG. 1 is a flowchart of a method for translating an image according to embodiments of the present disclosure.

It should be noted that an execution subject of the method for translating the image according to embodiments of the present disclosure is an apparatus for translating an image. The apparatus for translating the image may be integrated in an electronic device, such that the deformed image is obtained after the original image is deformed based on the deformation parameter, and the deformed image, the pre-translated image, and the mask image are merged to generate the target translated image. The electronic device may be any terminal device or server that may perform data processing, which is not limited in the present disclosure.

As illustrated in FIG. 1, the method for translating the image may include the following.

At block 101, an image translation request is obtained. The image translation request includes an original image.

In practical applications, the image translation request may be obtained through different implementations in different scenes. As a possible implementation, a user may input an instruction of the image translation request through an input box.

As another possible implementation, in a case that a trigger operation on an image translation program is obtained from the user, it is determined that the image translation request is obtained. For example, in a case that the user clicks a key on a touch screen for starting image translation, it is determined that the image translation request is obtained.

As yet another possible implementation, a hook function may be set in a message control class of the image translation program in advance, to detect a message carrying the image translation request based on the hook function. In detail, in response to sending by the user the image translation request, a trigger message may be sent. In this case, a function of the message control class is called. Therefore, the hook function set in the function of the message control class may detect the calling of the function of the message control class, and identify the message carrying the image translation request based on a type of message triggering the function of the message control class.

At block 102, the original image is processed to generate a pre-translated image, a mask image and a deformation parameter. The pre-translated image, the mask image and the deformation parameter correspond to the original image.

The pre-translated image is an image obtained by directly translating the original image. The deformation parameter is a parameter required to deform the original image when processing the original image. That is, the deformation parameter is a translation distance that each pixel of the original image is translated. That is to say, the deformation parameter includes the translation distance of each pixel in an x-axis direction and the translation distance of each pixel in a y-axis direction. The mask image is a template used for image filter processing. The main function of the mask image is to mask a certain region of an image to prevent the region from being processed or being used for calculating the parameter. Similarity variable or an image matching method may be used to detect and extract a structural feature similar to a mask from the image.

Figure 2A:
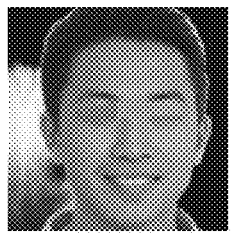
FIG. 2a is a schematic diagram of an original image in an application scene of gender conversion between a male face and a female face according to embodiments of the present disclosure.
Figure 2B:
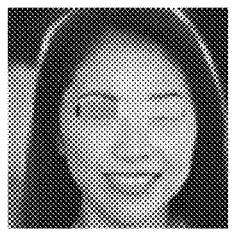
FIG. 2b is a schematic diagram of a pre-translated image in an application scene of gender conversion between a male face and a female face according to embodiments of the present disclosure.

For example, in an application scene of gender conversion between a male face and a female face, in a case that the original image includes a male face (as illustrated in FIG. 2a), after the male face is directly converted into female, an unmerged image of the female face may be generated. The unmerged image of the female face is the pre-translated image (as illustrated in FIG. 2b) corresponding to the original image.

It should be noted that if the resolution of the original image is 256*256, then the resolution of the pre-translated image is also 256*256, and 256*256 groups of deformation parameters are generated. Each group of deformation parameters includes parameters in the x-axis direction and parameters in the y-axis direction.

Figure 2C:
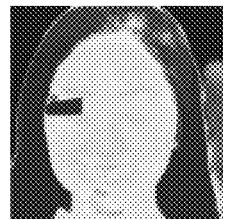
FIG. 2c is a schematic diagram of a mask image in an application scene of gender conversion between a male face and a female face according to embodiments of the present disclosure.

That is, after the original image is obtained from the image translation request, the original image may be processed to obtain the pre-translated image, the mask image (for example, the mask image may be as illustrated in FIG. 2c in the application scene of gender conversion between the male face and the female face), and the deformation parameter. The target translated image corresponding to the original image is obtained based on the pre-translated image, the deformation parameter and the mask image.

At block 103, the original image is deformed based on the deformation parameter to obtain a deformed image.

The original image may be deformed by an image conversion means based on the deformation parameter to generate the deformed image.

Figure 2D:
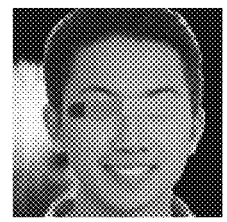
FIG. 2d is a schematic diagram of a deformed image in an application scene of gender conversion between a male face and a female face according to embodiments of the present disclosure.

For example, the original image includes the male face. The deformation parameter may be used to narrow an eyebrow region of the male face in the y-axis direction. As illustrated in FIG. 2d, eyebrows of the male face in the deformed image are narrower than the original image, after the original image is deformed by the image conversion means based on the deformation parameter, to enable the eyebrows closer to female eyebrows.

At block 104, the deformed image, the pre-translated image and the mask image are merged to generate a target translated image.

In detail, in an actual operation process, if only the original image is processed to generate a preset translated image as a final output image, the final output image has a low resolution and the background of the converted image is also different from the original image. Consequently, it is difficult to achieve natural convergence and seamless merging since a visible border exists during the merging of the images.

Figure 2E:
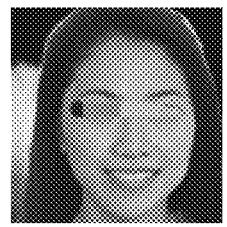
FIG. 2e is a schematic diagram of a target translated image in an application scene of gender conversion between a male face and a female face according to embodiments of the present disclosure.

Therefore, in the present disclosure, after the original image is processed, in addition to generating the pre-translated image corresponding to the original image, the mask image and the deformation parameter are generated. The original image is deformed based on the deformation parameter to obtain the deformed image. The deformed image and the pre-translated image are merged based on weights from the mask image to generate the target translated image (for example, in the application scene of gender conversion between the male face and the female face, the target translated image may be illustrated in FIG. 2e). Therefore, since the deformed image is obtained by directly deforming the original image, detailed information of the original image is kept, so that the obtaining of the target translated image by merging the deformed image and the pre-translated image through the mask image make full use of high-definition and rich high-frequency details of the original image. In this manner, not only the clarity of the target translated image is improved, but also the background of the target translated image is the same with the original image, such that seamless merging of images may be realized and the naturalness of the target translated image is greatly improved.

For example, as another possible implementation, styles of images may also be converted through the above-mentioned method for translating the image. For instance, the image including a male/female face may be converted into an image in a style of, for example, oil painting, watercolor painting, or Chinese painting. In a case that the image including the male/female face is converted into an image in the style of oil painting, after the image translation request is obtained, the image including the male/female face may be directly converted into an unmerged image including the male/female face in the style of oil painting (i.e., the pre-translated image corresponding to the original image). In addition, the mask image and deformation parameter are obtained as well. The original image is deformed based on the deformation parameter. For example, in the deformation parameter, the deformation manner used for a line contour is to widen the line contour along the x-axis and y-axis directions. Therefore, line contours in the original image including the male/female face are widened by the image conversion means based on the deformation parameter, to obtain the deformed image. The deformed image and the pre-translated image are merged based on the weights from the mask image to generate the target translated image. As a result, it is possible to convert the image including the male/female face into the style of oil painting. Manners of converting the image including the male/female face image into the style of watercolor painting, the style of Chinese painting and other styles are similar to the above manner. For brevity, repeated description is omitted herein.

It should be noted that in the above embodiments, the original image may be processed by a target generator to generate the pre-translated image, the mask image, and the deformation parameter. All of the pre-translation image, the mask image and the deformation parameter correspond to the original image in different application scenes, the manner of obtaining the target generator is also different.

As a possible implementation, a first domain to which the target translated image belongs may be obtained, to obtain a first target generator according to the first domain to which the target translated image belongs. Correspondingly, in some embodiments of the present disclosure, the translation request further includes the first domain to which the target translated image belongs. Therefore, after the block 101, the method further includes obtaining the first target generator based on the first domain to which the target translated image belongs.

Correspondingly, the block 102 may include processing the original image using the first target generator, to generate the pre-translated image, the mask image and the deformation parameter corresponding to the original image.

In the field of image translation, different domains are used to distinguish the original image and the target translated image. For example, during gender translation, the image including the male face and the image including the female face are in different domains. As another example, when an image including an apple is translated into an image including an orange, an image including the apple and an image including the orange respectively belong to different domains.

Correspondingly, in the present disclosure, the first domain to which the target translated image belongs corresponding to an image including a specified type of objects, such as an image including a female face, or an image including an apple.

In detail, when images in different domains are translated, different generators are used. Therefore, in the present disclosure, after the translation request is received and the first domain to which the target translated image belongs is obtained from the translation request, the first generator corresponding to the first domain to which the target translated image belongs may be determined based on the first domain to which the target translated image belongs. In a case that one first generator corresponds to the first domain to which the target translated image belongs, the corresponding first target generator may be directly determined based on the first domain to which the target translated image belongs.

For example, in a case that the first domain to which the target translated image belongs corresponds to an image including a female face, it may be determined that the first generator corresponding to the target translated image includes only a generator that converts a male face into a female face. Therefore, it may be determined that the first target generator is the generator that converts a male face into a female face. In a case that the first domain to which the target translated image belongs corresponds to an image including a young face, it may be determined that the first generator corresponding to the target translated image includes only a generator that converts an old face to a young face. Therefore, it may be determined that the first target generator is the generator that converts an old face to a young face. Here, converting the male face into a female face means converting an image including the male face into an image including the female face. Similarly, converting an old face into a young face means converting an image including the old face into an image including the young face.

Further, after the first target generator is determined, the original image may be directly processed by the first target generator to generate the pre-translated image, the mask image, and the deformation parameter corresponding to the original image.

Therefore, before the original image is processed, the first target generator dedicated to the original image may be determined based on the first domain to which the target translated image belongs to process the original image, thereby greatly improving the efficiency and accuracy of image processing.

It should be noted that in the actual operation process, there is a case that the first domain to which the target translated image belongs corresponds to multiple first generators.

Correspondingly, in a case that the first domain to which the target translated image belongs corresponds to N first generators (or N types of first generators), where N is an integer greater than 1, the method further includes the following after the block 101.

The original image is recognized to determine a second domain to which the original image belongs. The first target generator is selected from the N first generators based on the second domain and the first domain.

In detail, in a case that the first domain to which the target translated image belongs corresponds to the multiple first generators based on the first domain to which the target translated image belongs, the original image may be recognized to obtain the second domain to which the original image belongs. One first generator is selected from the multiple first generators as the first target generator based on the first domain and the second domain.

For example, the first domain to which the target translated image belongs corresponds to an image including an apple. On the basis of the first domain to which the target translated image belongs, multiple first generators corresponding to the first domain to which the target translated image belongs may be determined, such as a first generator that converts an orange into an apple, a first generator that converts a pear into an apple, and a first generator that converts a peach into an apple. Further, it is determined that the second domain to which the original image belongs corresponds to an image including an orange, the first generator that converts an orange into an apple may be selected from the multiple first generators as the first target generator.

Further, after the first target generator is determined, the original image may be directly processed by the first target generator to generate the pre-translated image, the mask image and the deformation parameter corresponding to the original image.

Therefore, when it is determined that the first domain to which the target translated image belongs corresponds to multiple first generators based on the first domain to which the target translated image belongs, a unique first generator may be selected from the multiple first generators based on the second domain to which the original image belongs as the first target generator, to process the original image accordingly. Consequently, the efficiency and accuracy of image processing is further improved.

As another possible implementation, the second domain to which the original image belongs may be obtained, to obtain a second target generator according to the second domain to which the original image belongs. Correspondingly, in some embodiments of the present disclosure, after the block 101, the method may further include the following.

The original image is recognized to determine a second domain to which the original image belongs. A second target generator is determined based on the second domain to which the original image belongs.

Correspondingly, the block 102 may include the following.

The original image is processed using the second target generator to generate the pre-translated image, the mask image and the deformation parameter corresponding to the original image.

In detail, after the original image is obtained, the original image may be recognized to obtain the second domain to which the original image belongs. After the second domain to which the original image belongs is determined, the second generator corresponding to the second domain to which the original image belongs may be determined based on the second domain to which the original image belongs. In a case that one second generator corresponds to the second domain to which the original image belongs, a corresponding second target generator corresponding to the second domain to which the original image belongs may be directly determined.

For example, the second domain to which the original image belongs corresponds to an image including a male face. It may be determined that the second generator corresponding to the second domain to which the original image belongs includes only a second generator that converts a male face into a female face. Therefore, it may be determined that the second target generator is the second generator that converts a male face into a female face. As another example, the second domain to which the original image belongs corresponds to an image including an old man. It may be determined that the second generator corresponding to the second domain to which the original image belongs includes only a second generator that converts an old face into a young face. Therefore, it may be determined that the second target generator is the second generator that converts an old face into a young face.

Further, after the second target generator is determined, the original image may be directly processed using the second target generator to generate the pre-translated image, the mask image, and the deformation parameter corresponding to the original image.

Therefore, before the original image is processed, the second target generator dedicated to the original image may be determined based on the second domain to which the original image belongs to process the original image, thereby greatly improving the efficiency and accuracy of image processing.

It should be noted that in the actual operation process, there is a case that the second domain to which the original image belongs corresponds to multiple second generators. Correspondingly, in a case that the second domain to which the original image belongs corresponds to M second generators (or M types of second generators), where M is an integer greater than 1, the method may further include the following after the block 101.

The first domain to which the target translated image belongs is obtained. The second target generator is selected from the M second generators based on the first domain and the second domain.

In detail, in a case that the second domain to which the original image belongs corresponds to multiple second generators, the first domain to which the target translated image belongs may be obtained. If the first domain to which the target translated image belongs is included in the translation request, the first domain to which the target translated image belongs may be obtained directly from the translation request. If the first domain to which the target translated image belongs is not included in the translation request and the second domain to which the original image belongs corresponds to multiple second generators, a list of first domains may be provided for the user to select the first domain to which the target translated image belongs. Therefore, the user may make a selection based on the image type and feature information of the target translated image. After the first domain to which the target translated image belongs is determined, a second generator may be selected from the multiple second generators as the second target generator based on the first domain and the second domain.

For example, the second domain to which the original image belongs corresponds to an image including an orange. On the basis of the second domain to which the original image belongs, multiple second generators corresponding to the second domain to which the original image belongs may be determined, such as a second generator of converting an orange into an apple, a second generator of converting an orange into a pear, and a second generator of converting an orange into a peach. In a case that the first domain to which the target translated image belongs corresponds to an image including a pear, the second generator of converting an orange into a pear may be selected from the multiple second generators as the second target generator.

Further, after the second target generator is determined, the original image may be directly processed by the second target generator to generate the pre-translated image, the mask image, and the deformation parameter corresponding to the original image.

Therefore, when it is determined that the second domain to which the original image belongs corresponds to the multiple second generators based on the second domain to which the original image belongs, a unique second generator is selected from the multiple second generators based on the first domain to which the target translated image belongs as the second target generator, to process the original image accordingly. Consequently, the efficiency and accuracy of image processing is further improved.

It should be noted that generally, when processing an image, the feature information of the image is extracted, and the feature information is processed accordingly to realize image processing.

Figure 3:
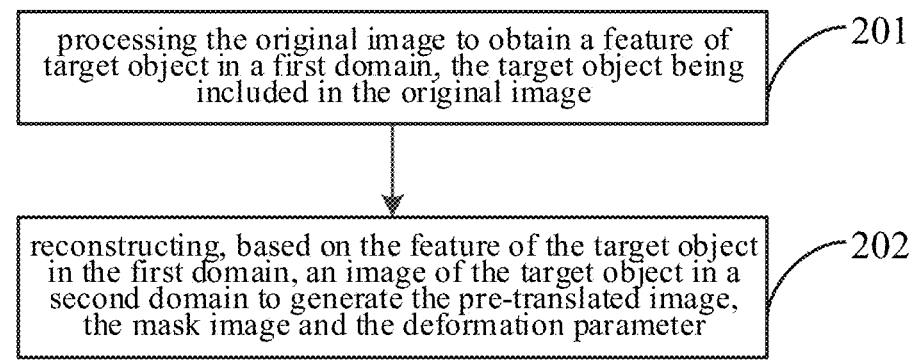
FIG. 3 is a flowchart of a method for translating an image according to embodiments of the present disclosure.

The above will be described below with reference to FIG. 3. As illustrated in FIG. 3, the block 201 may include the following.

At block 201, the original image is processed to obtain features of a target object in a first domain. The target object is included in the original image.

The target object is an object in the original image that is changed with respect to the target translated image. For example, if the original image is an image including a male face and the target translated image is an image including a female face corresponding to the male face, the target object is the male face in the original image. Correspondingly, features of the target object in the first domain may include features of the target object and features of a background besides the target object.

At block 202, an image of the target object in a second domain is reconstructed based on the feature of the target object in the first domain, to generate the pre-translated image, the mask image and the deformation parameter.

In detail, after obtaining the features of the target object in the first domain, the feature of the target object may be decoded by the first generator to reconstruct the image of the target object in the second domain, to generate the pre-translated image. In the process of reconstructing the image of the target object, the mask image and the deformation parameter are generated.

It may be understood that the pre-translated image, the mask image, and the deformation parameter are all generated based on the features of the target object in the first domain. That is, both the mask image and the deformation parameter are generated based on a difference between the pre-translated image and the original image, such that the target translated image that is obtained by merging the mask image and the deformed image obtained based on the deformation parameter is accurate.

Furthermore, in order to generate a high-definition and high-naturalness target translated image, after the pre-translated image, the mask image, and the deformation parameter are obtained, the original image may be deformed based on the deformation parameter to obtain the deformed image. The deformed image and the pre-translated image may be merged based on weights from the mask image to generate the target translated image.

Figure 4:
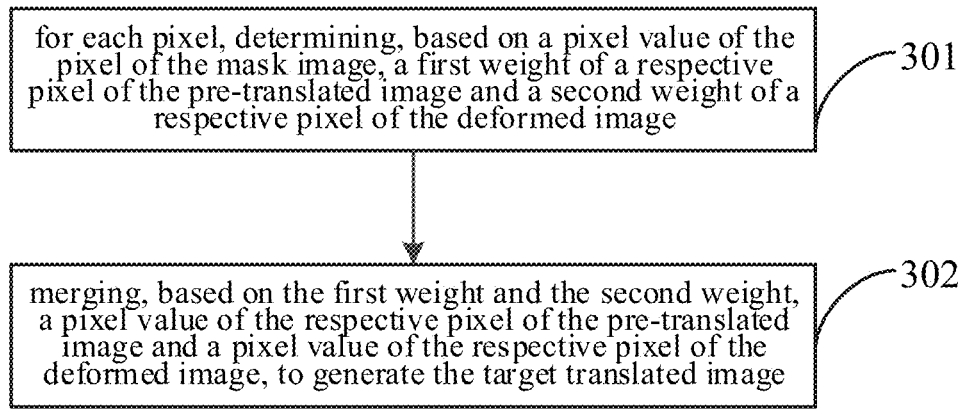
FIG. 4 is a flowchart of a method for translating an image according to embodiments of the present disclosure.

The following describes in detail how to generate the target translated image with reference to FIG. 4. As illustrated in FIG. 4, the block 104 may include the following.

At block 301, for each pixel, a first weight of a respective pixel of the pre-translated image and a second weight of a respective pixel of the deformed image are determined based on a pixel value of the pixel of the mask image.

At block 302, a pixel value of the respective pixel of the pre-translated image and a pixel value of the respective pixel of the deformed image are merged based on the first weight and the second weight to generate target translated image.

In detail, for each pixel, the first weight of the pre-translated image and the second weight of the deformed image may be determined based on the pixel value of the pixel of the mask image. Based on a weight ratio of the first weight and the second weight, for each pixel of the target translated image, a ratio of the pixel value of the pre-translated image to the pixel value of the deformed image is obtained. The pixel value of the respective pixel of the pre-translated image and the pixel value of the respective pixel of the deformed image are merged based on the ratio.

In practical applications, a pixel value of one pixel of the mask image may be a weight of a corresponding pixel of the pre-translated image, or a weight of a corresponding pixel of the deformed image. The corresponding pixel means for example a pixel having a same position or having a same pixel index. For example, the pixel value of an $i^{th}$ pixel of the mask image is 0.7, which indicates that the weight of the $i^{th}$ pixel of the pre-translated image is 0.7 (or 0.3) and the weight of the $i^{th}$ pixel of the deformed image is 0.3 (or 0.7). As another example, the pixel value of the $i^{th}$ pixel of the pre-translated image is 10 and the pixel value of the $i^{th}$ pixel of the deformed image is 30, the pixel value of the $i^{th}$ pixel of the target translated image is 22 or 24.

Therefore, the pixel value of the pixel of the deformed image and the pixel value of the corresponding pixel of the pre-translated image are merged based on the weights from the mask image, so that the pixel value of the respective pixel of the target translated image generated after the merging may not only meet needs of translation, but also fully reflect the high-definition and rich high-frequency detail information of the original image. Consequently, not only the clarity of the target translated image is improved, but also the background of the target translated image is same with the original image. Seamless merging of images may be realized and the naturalness of the target translated image generated is greatly improved.

With the method for translating the image according to embodiments of the present disclosure, the image translation request is obtained. The original image carried by the image translation request is processed to generate the pre-translated image, the mask image, and the deformation parameter corresponding to the original image. The original image is deformed based on the deformation parameter to obtain the deformed image. The deformed image, the pre-translated image and the mask image are merged to generate the target translated image. Therefore, the target translated image includes the deformed image obtained by deforming the original image, such that the target translated image makes full use of high-definition and rich high-frequency details of the original image. In this manner, not only the clarity of the target translated image generated is improved, but also the background of the target translated image is same with the original image. Seamless merging of images may be realized and the naturalness of the target translated image generated is greatly improved.

Figure 5:
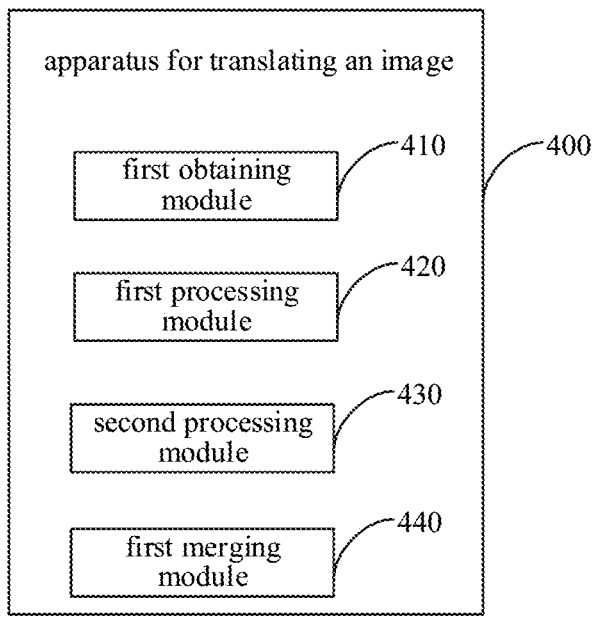
FIG. 5 is a schematic diagram of an apparatus for translating an image according to embodiments of the present disclosure.

To implement the above embodiments, embodiments of the present disclosure also provide an apparatus for translating an image. The apparatus for translating an image may be installed in an electronic device. FIG. 5 is a schematic diagram of an apparatus for translating an image according to embodiments of the present disclosure.

As illustrated in FIG. 5, an apparatus 400 for translating an image may include a first obtaining module 410, a first processing module 420, a second processing module 430, and a first merging module 440.

The first obtaining module 410 is configured to obtain an image translation request. The image translation request includes an original image. The first processing module 420 is configured to process the original image to generate a pre-translated image, a mask image and a deformation parameter. The pre-translated image, the mask image and the deformation parameter correspond to the original image. The second processing module 430 is configured to deform the original image based on the deformation parameter to obtain a deformed image. The first merging module 440 is configured to merge the deformed image, the pre-translated image and the mask image to generate a target translated image.

In a possible implementation of embodiments of the present disclosure, the image translation request further includes a first domain to which the target translated image belongs. After obtaining the image translation request, the first obtaining module 410 is further configured to obtain a first target generator corresponding to the first domain to which the target translated image belongs. The first processing module 420 is configured to process the original image using the first target generator, to generate the pre-translated image, the mask image and the deformation parameter.

In a possible implementation of embodiments of the present disclosure, in a case that the first domain corresponds to N first generators, where N is an integer greater than 1, after obtaining the image translation request, the first obtaining module 410 is further configured to: recognize the original image to determine a second domain to which the original image belongs; and select the first target generator from the N first generators based on the second domain and the first domain.

In a possible implementation of embodiments of the present disclosure, after obtaining the image translation request, the first obtaining module 410 is further configured to: recognize the original image to determine a second domain to which the original image belongs; and obtain a second target generator corresponding to the second domain to which the original image belongs. The first processing module 420 is configured to process the original image using the second target generator to generate the pre-translated image, the mask image and the deformation parameter.

In a possible implementation of embodiments of the present disclosure, in a case that the second domain corresponds to M second generators, where M is an integer greater than 1, after obtaining the image translation request, the first obtaining module 410 is further configured to: obtain a first domain to which the target translated image belongs; and select the second target generator from the M second generators based on the first domain and the second domain.

Figure 6:
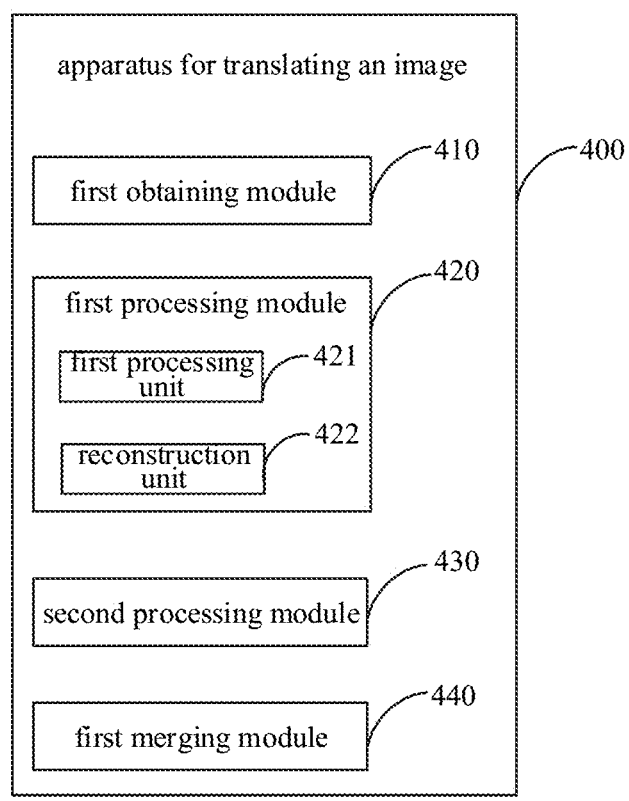
FIG. 6 is a schematic diagram of an apparatus for translating an image according to embodiments of the present disclosure.

FIG. 6 is a schematic diagram of an apparatus for translating an image according to embodiments of the present disclosure. In a possible implementation of embodiments of the present disclosure, as illustrated in FIG. 6, the first processing module 420 may include a first processing unit 421 and a reconstruction unit 422.

The first processing unit 421 is configured to process the original image to obtain features of a target object in a first domain. The target object is included in the original image. The reconstruction unit 422 is configured to reconstruct, based on the features of the target object in the first domain, an image of the target object in a second domain, to generate the pre-translated image, the mask image and the deformation parameter.

Figure 7:
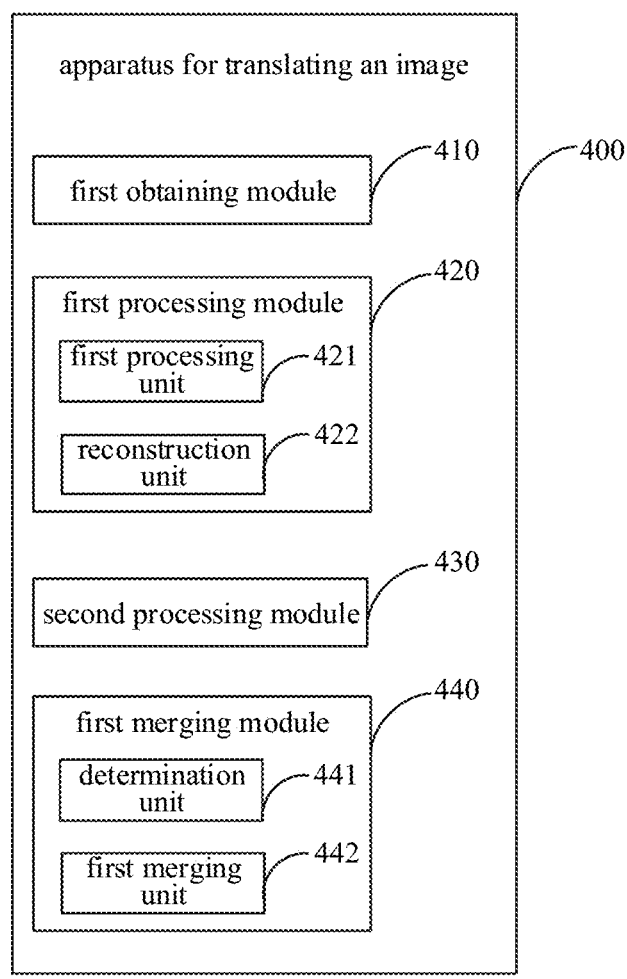
FIG. 7 is a schematic diagram of an apparatus for translating an image according to embodiments of the present disclosure.

FIG. 7 is a schematic diagram of an apparatus for translating an image according to embodiments of the present disclosure. In a possible implementation of embodiments of the present disclosure, as illustrated in FIG. 7, the first merging module 440 includes a determination unit 441 and a first merging unit 442.

The determination unit 441 is configured to, for each pixel, determine, based on a pixel value of the pixel of the mask image, a first weight of a respective pixel of the pre-translated image and a second weight of a respective pixel of the deformed image. The first merging unit 442 is configured to merge, based on the first weight and the second weight, a pixel value of the respective pixel of the pre-translated image and a pixel value of the respective pixel of the deformed image, to generate the target translated image.

It should be noted that, for details of the apparatus for translating the image according to embodiments of the present disclosure that are not disclosed, reference may be made to details of the method for translating the image according to embodiments of the present disclosure. Repeated description is omitted herein.

With the apparatus for translating the image according to embodiments of the present disclosure, the first obtaining module is configured to obtain the image translation request. The image translation request includes the original image. The first processing module is configured to process the original image to generate the pre-translated image, the mask image and the deformation parameter. The pre-translated image, the mask image and the deformation parameter correspond to the original image. The second processing module is configured to deform the original image based on the deformation parameter to obtain the deformed image. The first merging module is configured to merge the deformed image, the pre-translated image and the mask image to generate the target translated image. In this manner, the target translated image generated includes the deformed image generated from the original image. Consequently, the target translated image makes full use of the high-definition and rich high-frequency details of the original image input. And thus, not only the clarity of the target translated image generated is improved, but the background of the target translated image generated is consistent with that of the original image, such that seamless merging of images may be realized, and the naturalness of the target translated image generated is greatly improved.

Figure 8:
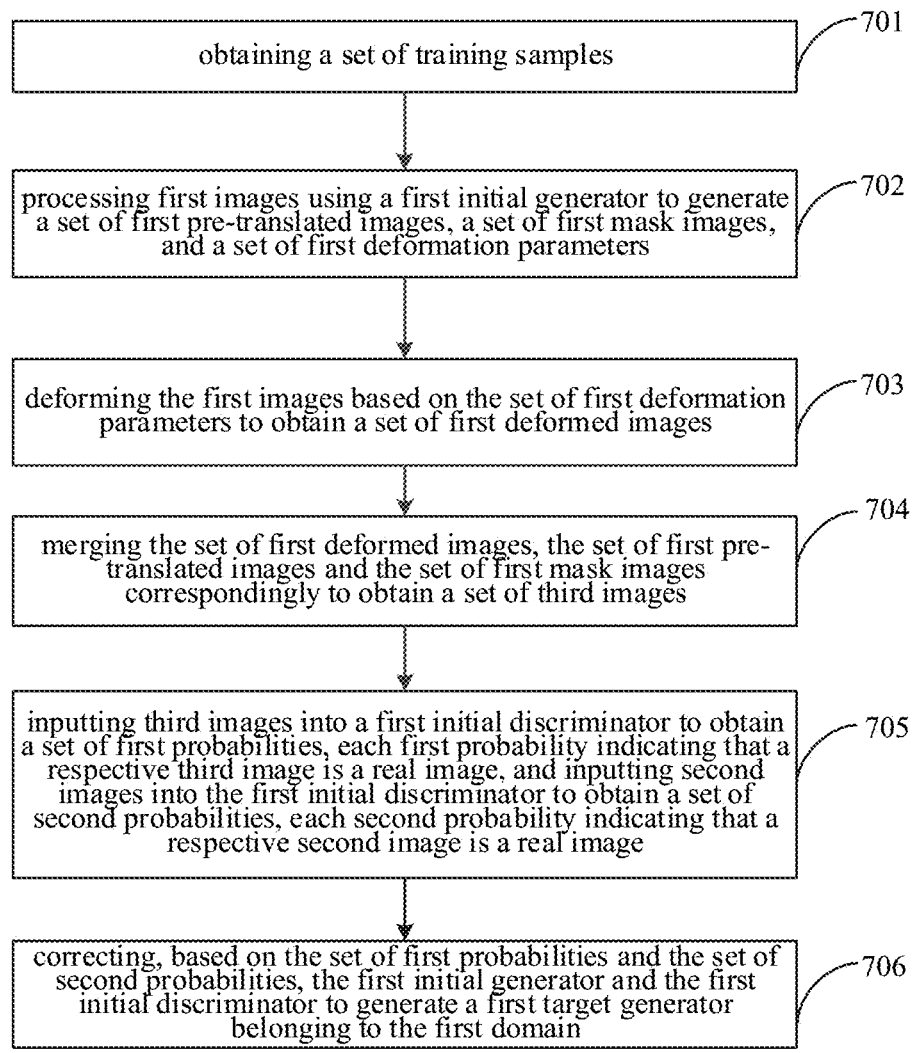
FIG. 8 is a flowchart of a method for training an image translation model according to embodiments of the present disclosure.

To implement the above embodiments, embodiments of the present disclosure further provide a method for training an image translation model. The image for training an image described above may be implemented by the image translation model. FIG. 8 is a flowchart of a method for training an image translation model according to embodiments of the present disclosure.

It should be noted that an execution subject of the method for training an image translation model according to embodiments of the present disclosure is an apparatus for training an image translation model. The apparatus for training an image translation model may be integrated in an electronic device, to train the image translation model and to obtain the first generator. The electronic device may be any terminal device or server that may perform data processing, which is not limited in the present disclosure.

As illustrated in FIG. 8, the method for training an image translation model may include the following.

At block 701, a set of training samples is obtained.

The set of training samples includes a set of first images belonging to a first domain and a set of second images belonging to a second domain.

At block 702, first images in the set of first images are processed respectively using a first initial generator to generate a set of first pre-translated images, a set of first mask images, and a set of first deformation parameters.

At block 703, the first images in the set of first images are deformed based on the set of first deformation parameters to obtain a set of first deformed images.

At block 704, the set of first deformed images, the set of first pre-translated images and the set of first mask images are merged correspondingly to obtain a set of third images.

At block 705, third images in the set of third images are inputted respectively into a first initial discriminator to obtain a set of first probabilities. Each first probability indicates that a respective third image is a real image. Second images in the set of second images are inputted respectively into the first initial discriminator to obtain a set of second probabilities. Each second probability indicates that a respective second image is a real image.

At block 706, the first initial generator and the first initial discriminator are corrected based on the set of first probabilities and the set of second probabilities to generate a first target generator belonging to the first domain. The first target generator belonging to the first domain is configured to translate an image in the first domain into an image in the second domain.

A one-to-one correspondence exists between the first images in the set of first images and the second images in the set of second images.

In detail, when the one-to-one correspondence exists between the first images in the set of first images in the set of training samples and the second images in the set of second images in the set of training samples, first images in the set of first images may be used as an input of the first initial generator. The first images in the set of first images are translated using the first initial generator to obtain the set of third images belonging to the second domain. For the process of translating the set of first images, reference may be made to the method for translating an image according to the above embodiments. To avoid redundancy, repeated description is omitted herein.

After the set of third images is obtained, the third images in the set of third images may be inputted respectively into the first initial discriminator to output the set of first probabilities that each third image is a real image. The second images in the set of second images may be inputted into the first initial discriminator respectively to output the set of second probabilities that each second image is a real image. The first initial generator and the first initial discriminator may be corrected by comparing values of first probabilities in the set of first probabilities and values of the second probabilities in the set of second probabilities.

When a first probability is greatly different from a corresponding second probability, an error of translating the image by the first initial generator is larger than a preset threshold. Therefore, the first initial generator and the first initial discriminator are corrected correspondingly to obtain the first target generator belonging to the first domain. When a difference between the first probability and the corresponding second probability is small, the error of translating the image by the first initial generator is smaller than the preset threshold. Therefore, there is no need to correct the first initial generator and the first initial discriminator. The first initial generator may be directly used as the first target generator belonging to the first domain. The first target generator belonging to the first domain may be determined as an image translation model to translate an image in the first domain into an image in the second domain.

Therefore, the image translation model is trained. An image is translated by the trained image translation model to generate the target translated image. The target translated image generated includes the deformed image obtained by deforming the original image. Consequently, the target translated image makes full use of the high-definition and rich high-frequency details of the original image. Not only the clarity of the target translated image generated is improved, but also the background of the target translated image generated is same with the original image. Seamless merging of images may be realized, and the naturalness of the target translated image generated is greatly improved. In addition, the method for training an image translation model is simple and efficient, and the load of the image translation model is low.

It should be noted that, if a first image in the set of first images does not match a corresponding second image in the set of second images, the third image in the set of third images obtained through the above embodiments does not match the corresponding second image in the set of second images. Consequently, the first initial generator and the first initial discriminator cannot be corrected accurately based on the set of first probabilities and the set of second probabilities, causing a large error of the image translation model generated.

Figure 9:
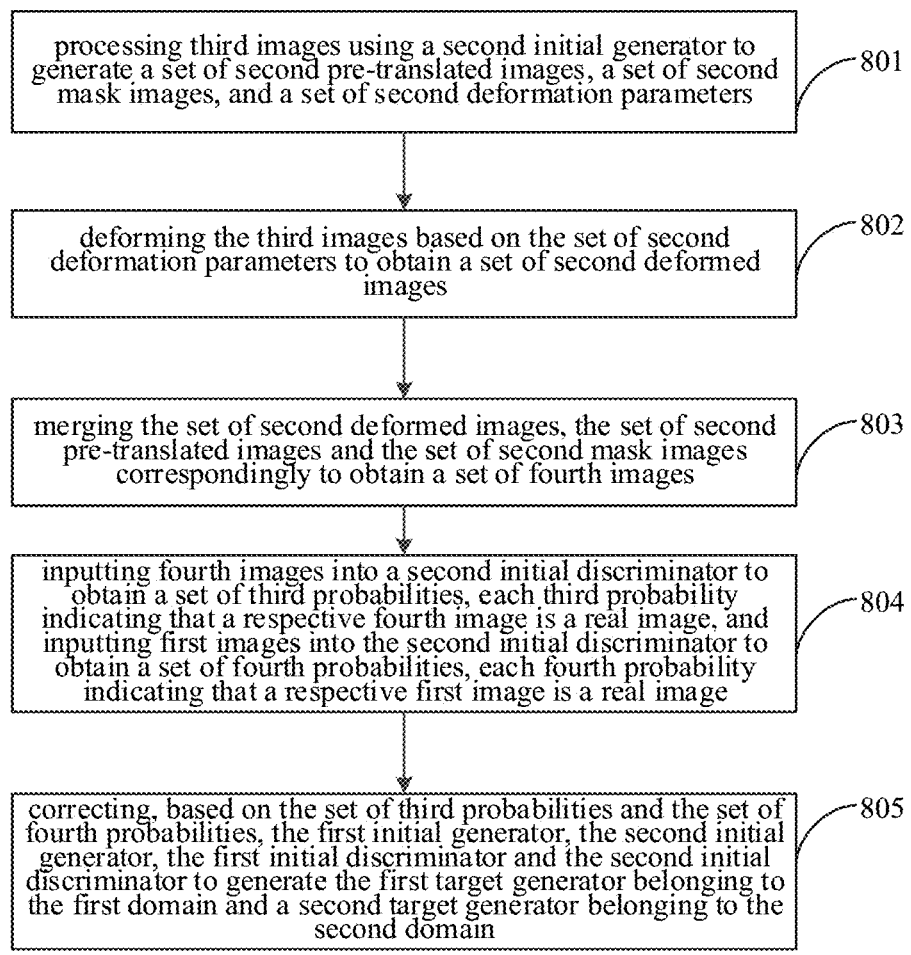
FIG. 9 is a flowchart of a method for training an image translation model according to embodiments of the present disclosure.

Therefore, in some embodiments of the present disclosure, in a case that a first image in the set of first images does not match a corresponding second image in the set of second images, as illustrated in FIG. 9, the method further includes the following after the block 706.

At block 801, third images in the set of third images are processed respectively using a second initial generator to generate a set of second pre-translated images, a set of second mask images, and a set of second deformation parameters.

At block 802, the third images in the set of third images are deformed based on the set of second deformation parameters to obtain a set of second deformed images.

At block 803, the set of second deformed images, the set of second pre-translated images and the set of second mask images are merged correspondingly to obtain a set of fourth images.

At block 804, fourth images in the set of fourth images are inputted into a second initial discriminator respectively to obtain a set of third probabilities that each fourth image is a real image. The first images in the set of first images are inputted into the second initial discriminator respectively to obtain a set of fourth probabilities that each first image is a real image.

At block 805, the first initial generator, the second initial generator, the first initial discriminator and the second initial discriminator are corrected based on the set of third probabilities and the set of fourth probabilities to generate the first target generator belonging to the first domain and a second target generator belonging to the second domain. The first target generator belonging to the first domain is configured to translate an image in the first domain into an image in the second domain. The second target generator belonging to the second domain is configured to translate an image in the second domain into an image in the first domain.

In detail, when the first image in the set of first images in the set of training samples does not match the corresponding second image in the set of second images in the set of training samples, the third images in the set of third images may be inputted to the second initial generator. The third images in the set of third images are translated using the second initial generator to obtain the set of fourth images belonging to the first domain. For the process of translating the third images in the set of third images, reference may be made to the method for translating the image according to the above embodiments. To avoid redundancy, repeated description is omitted herein.

After the set of fourth images is obtained, the fourth images in the set of fourth images may be inputted into the second initial discriminator respectively to obtain the set of third probabilities. Each third probability indicates that a respective fourth image is a real image. The first images in the set of first images may be inputted into the second initial discriminator respectively to obtain the set of fourth probabilities. Each fourth probability indicates that a respective first image is a real image. The first initial generator, the second initial generator, the first initial discriminator and the second initial discriminator may be corrected by comparing values of third probabilities in the set of third probabilities and values of fourth probabilities in the set of fourth probabilities.

When a difference between a third probability in the set of third probabilities and a corresponding fourth probability in the set of fourth probabilities is large, an error of translating the image by the first initial generator and the second initial generator is larger than a preset threshold. Therefore, the first initial generator, the second initial generator, the first initial discriminator, and the second initial discriminator are corrected correspondingly to obtain the first target generator belonging to the first domain and the second target generator belonging to the second domain. When the difference between a third probability in the set of third probabilities and a corresponding fourth probability in the set of fourth probabilities is smaller than the preset threshold, the error of translating the image by the first initial generator and the second initial generator is small. Therefore, there is no need to correct the first initial generator, the second initial generator, the first initial discriminator, and the second initial discriminator. The first initial generator may be directly used as the first target generator belonging to the first domain. The second initial generator may be directly used as the second target generator belonging to the second domain. The first target generator belonging to the first domain may be determined as an image translation model to translate an image in the first domain into an image in the second domain. The second target generator belonging to the second domain may be determined as an image translation model to translate an image in the second domain into an image in the first domain. The first target generator belonging to the first domain according to the embodiment may be identical to, or different from, the first target generator belonging to the first domain according to the above embodiments, and may be selected based on requirements in actual conditions.

Therefore, the image translation model is trained. An image is translated by the image translation model to generate the target translated image. The target translated image generated includes the deformed image obtained by deforming the original image. Consequently, the target translated image makes full use of the high-definition and rich high-frequency details of the original image input. Not only the clarity of the target translated image generated is improved, but the background of the target translated image generated is same with the original image. Seamless merging of images may be realized, and the naturalness of the target translated image generated is greatly improved. In addition, the method for training an image translation model is simple and efficient, and the load of the image translation model is low.

With the method for training an image translation model according to embodiments of the present disclosure, the set of training samples is obtained. The set of training samples includes the set of first images belonging to the first domain and the set of second images belonging to the second domain. The first images in the set of first images are processed using the first initial generator to generate the set of first pre-translated images, the set of first mask images, and the set of first deformation parameters. The first images in the set of first images are deformed based on the set of first deformation parameters to obtain the set of first deformed images. The set of first deformed images, the set of first pre-translated images and the set of first mask images are merged correspondingly to obtain the set of third images. The third images in the set of third images are inputted into the first initial discriminator to obtain the set of first probabilities. Each first probability indicates that a respective third image is a real image. The second images in the set of second images are inputted into the first initial discriminator to obtain the set of second probabilities. Each second probability indicates that a respective second image is a real image. The first initial generator and the first initial discriminator are corrected based on the set of first probabilities and the set of second probabilities to generate the first target generator belonging to the first domain. The first target generator belonging to the first domain is configured to translate an image in the first domain into an image in the second domain. Therefore, the image translation model is trained. An image is translated by the image translation model to generate the target translated image. The target translated image generated includes the deformed image by deforming the original image. Consequently, the target translated image makes full use of the high-definition and rich high-frequency details of the original image input. Not only the clarity of the target translated image generated is improved, but the background of the target translated image generated is same with the original image. Seamless merging of images may be realized, and the naturalness of the target translated image generated is greatly improved. In addition, the method for training an image translation model is simple and efficient, and the load of the image translation model is low.

Figure 10:
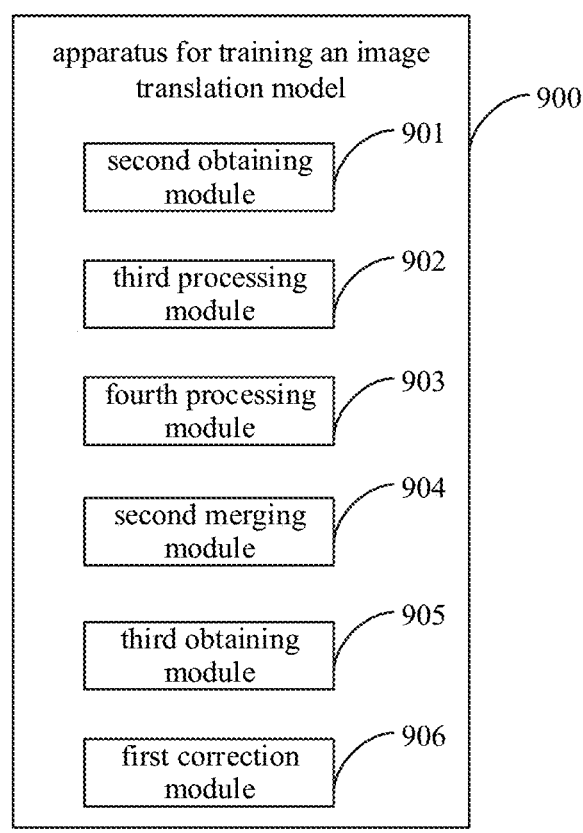
FIG. 10 is a schematic diagram of an apparatus for training an image translation model according to embodiments of the present disclosure.

To implement the above embodiments, embodiments of the present disclosure further provide an apparatus for training an image translation model. The apparatus for training the image translation model may be installed in an electronic device. FIG. 10 is a schematic diagram of an apparatus for training an image translation model according to embodiments of the present disclosure.

As illustrated in FIG. 10, an apparatus 900 for training an image translation model may include a second obtaining module 901, a third processing module 902, a fourth processing module 903, a second merging module 904, a third obtaining module 905, and a first correction module 906.

The second obtaining module 901 is configured to obtain a set of training samples. The set of training samples includes a set of first images belonging to a first domain and a set of second images belonging to a second domain. The third processing module 902 is configured to process the set of first images using a first initial generator to generate a set of first pre-translated images, a set of first mask images, and a set of first deformation parameters. The fourth processing module 903 is configured to deform the first images in the set of first images based on the set of first deformation parameters to obtain a set of first deformed images. The second merging module 904 is configured to merge the set of first deformed images, the set of first pre-translated images and the set of first mask images correspondingly to obtain a set of third images. The third obtaining module 905 is configured to input the set of third images into a first initial discriminator to obtain a set of first probabilities. Each first probability indicates that a respective third image is a real image. The third obtaining module 905 is configured to input the set of second images into the first initial discriminator to obtain a set of second probabilities. Each second probability indicates that a respective second image is a real image. The first correction module 906 is configured to correct, based on the set of first probabilities and the set of second probabilities, the first initial generator and the first initial discriminator to generate a first target generator belonging to the first domain. The first target generator belonging to the first domain is configured to translate an image in the first domain into an image in the second domain.

In some embodiments of the present disclosure, a one-to-one correspondence exists between the first images in the set of first images and the second images in the set of second images.

Figure 11:
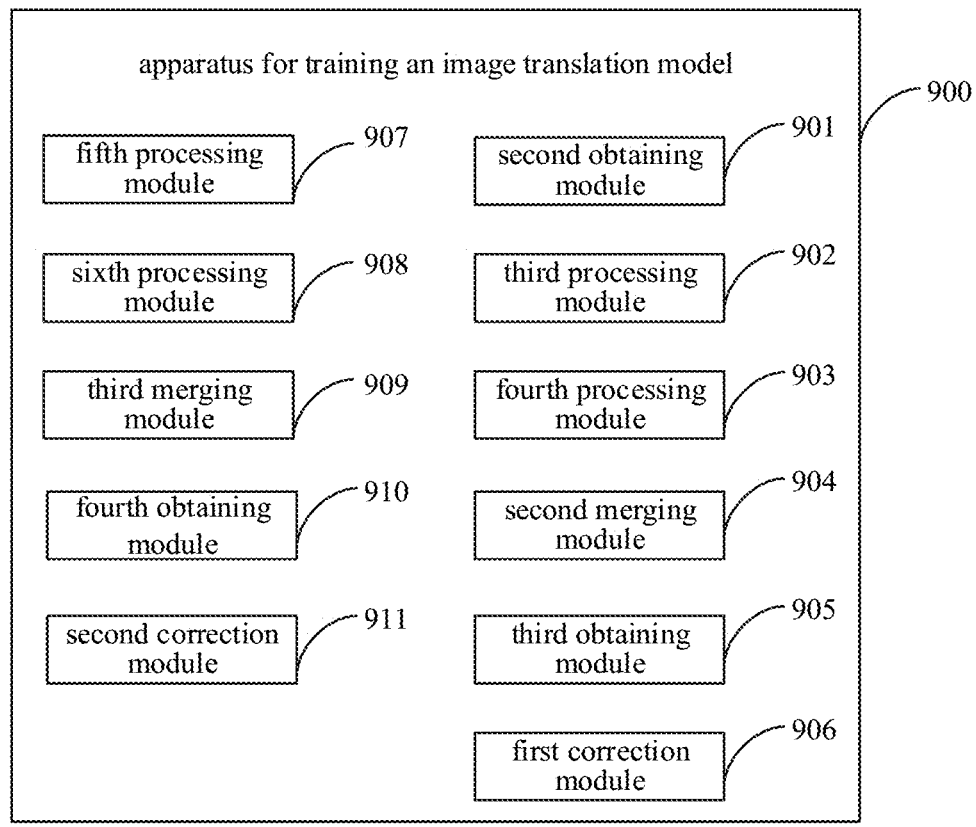
FIG. 11 is a schematic diagram of an apparatus for training an image translation model according to embodiments of the present disclosure.

FIG. 11 is a schematic diagram of an apparatus for training an image translation model according to embodiments of the present disclosure. In a possible implementation according to embodiments of the present disclosure, the first images in the set of first images do not match the second images in the set of second images. As illustrated in FIG. 11, the apparatus for training the image translation model includes a fifth processing module 907, a sixth processing module 908, a third merging module 909, a fourth obtaining module 910, and a second correction module 911.

The fifth processing module 907 is configured to process the set of third images using a second initial generator to generate a set of second pre-translated images, a set of second mask images, and a set of second deformation parameters. The sixth processing module 908 is configured to deform the third images in the set of third images based on the set of second deformation parameters to obtain a set of second deformed images. The third merging module 909 is configured to merge the set of second deformed images, the set of second pre-translated images and the set of second mask images correspondingly to obtain a set of fourth images. The fourth obtaining module 910 is configured to input the set of fourth images into a second initial discriminator to obtain a set of third probabilities. Each third probability indicates that a respective fourth image is a real image. The fourth obtaining module 910 is configured to input the set of first images into the second initial discriminator to obtain a set of fourth probabilities. Each fourth probability indicates that a respective first image is a real image. The second correction module 911 is configured to correct, based on the set of third probabilities and the set of fourth probabilities, the first initial generator, the second initial generator, the first initial discriminator and the second initial discriminator to generate the first target generator belonging to the first domain and a second target generator belonging to the second domain. The first target generator belonging to the first domain is configured to translate an image in the first domain into an image in the second domain. The second target generator belonging to the second domain is configured to translate an image in the second domain into an image in the first domain.

It should be noted that, for details of the apparatus for training the image translation model according to embodiments of the present disclosure that are not disclosed, reference may be made to details of the method for training the image translation model according to embodiments of the present disclosure. Repeated description is omitted herein.

With the apparatus for training the image translation model according to embodiments of the present disclosure, the second obtaining module is configured to obtain the set of training samples. The set of training samples includes the set of first images belonging to the first domain and the set of second images belonging to the second domain. The third processing module is configured to process the set of first images using the first initial generator to generate the set of first pre-translated images, the set of first mask images, and the set of first deformation parameters. The fourth processing module is configured to deform the first images in the set of first images based on the set of first deformation parameters to obtain the set of first deformed images. The second merging module is configured to merge the set of first deformed images, the set of first pre-translated images and the set of first mask images correspondingly to obtain the set of third images. The third obtaining module is configured to input the set of third images into the first initial discriminator to obtain the set of first probabilities. Each first probability indicates that the respective third image is a real image. The third obtaining module is configured to input the set of second images into the first initial discriminator to obtain the set of second probabilities. Each second probability indicates that the respective second image is a real image. The first correction module is configured to correct, based on the set of first probabilities and the set of second probabilities, the first initial generator and the first initial discriminator to generate the first target generator belonging to the first domain. The first target generator belonging to the first domain is configured to translate an image in the first domain into an image in the second domain. Therefore, the image translation model is trained. An image is translated by the image translation model. The target translated image generated includes the deformed image deformed from the original image. Consequently, the target translated image makes full use of the high-definition and rich high-frequency details of the original image input. And thus, not only the clarity of the target translated image generated is improved, but the background of the target translated image generated is consistent with that of the original image, such that seamless merging of images may be realized, and the naturalness of the target translated image generated is greatly improved. In addition, the method for training the image translation model is simple and efficient, and the load of the image translation model is low.

According to embodiments of the present disclosure, the present disclosure further provides an electronic device and a readable storage medium.

Figure 12:
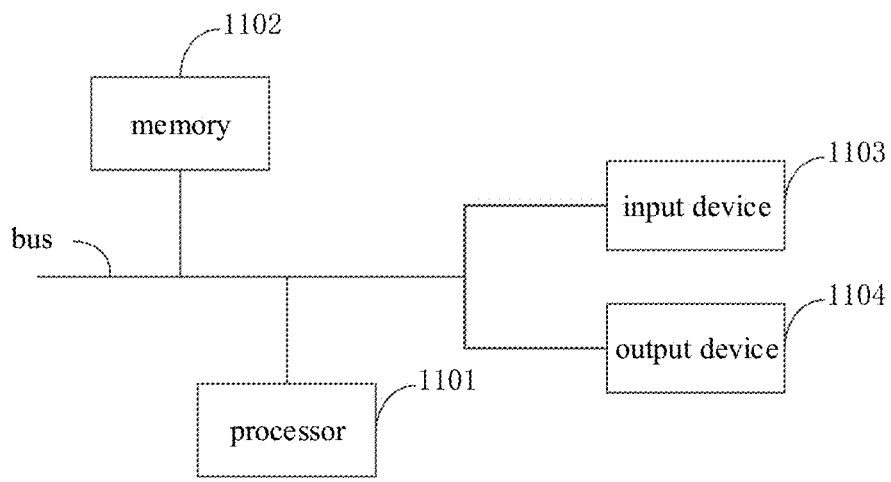
FIG. 12 is a block diagram of an electronic device configured to implement a method for translating an image or a method for training an image translation model according to embodiments of the present disclosure.

FIG. 12 is a block diagram of an electronic device configured to implement a method for translating an image or a method for training an image translation model according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 12, the electronic device includes one or more processors 1101, a memory 1102, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 1101 is taken as an example in FIG. 12.

The memory 1102 is a non-transitory computer-readable storage medium provided by the present disclosure. The memory stores instructions executable by at least one processor, so that the at least one processor executes the method for translating the image or the method for training the image translation model provided by the present disclosure. The non-transitory computer-readable storage medium according to the present disclosure stores computer instructions, which are configured to make the computer execute the method for translating the image or the method for training the image translation model provided by the present disclosure.

As a non-transitory computer-readable storage medium, the memory 1102 may be configured to store non-transitory software programs, non-transitory computer executable programs and modules, such as program instructions/modules (for example, the first obtaining module 410, the first processing module 420, the second processing module 430, and the first merging module 440 illustrated in FIG. 5, and the second obtaining module 901, the third processing module 902, the fourth processing module 903, the second merging module 904, the third obtaining module 905, and the first correction module 906 illustrated in FIG. 10) corresponding to the method for translating the image or the method for training the image translation model according to embodiments of the present disclosure. The processor 1101 executes various functional applications and performs data processing of the server by running non-transitory software programs, instructions and modules stored in the memory 1102, that is, the method for translating the image or the method for training the image translation model according to the foregoing method embodiments is implemented.

The memory 1102 may include a storage program area and a storage data area, where the storage program area may store an operating system and applications required for at least one function; and the storage data area may store data created according to the use of the electronic device that implements the method for translating the image or the method for training the image translation model, and the like. In addition, the memory 1102 may include a high-speed random-access memory, and may further include a non-transitory memory, such as at least one magnetic disk memory, a flash memory device, or other non-transitory solid-state memories. In some embodiments, the memory 1102 may optionally include memories remotely disposed with respect to the processor 1101, and these remote memories may be connected to the electronic device, which is configured to implement the method for translating the image or the method for training the image translation model, through a network. Examples of the network include, but are not limited to, the Internet, an intranet, a local area network, a mobile communication network, and combinations thereof.

The electronic device configured to implement the method for translating the image or the method for training the image translation model may further include an input device 1103 and an output device 1104. The processor 1101, the memory 1102, the input device 1103 and the output device 1104 may be connected through a bus or in other manners. FIG. 11 is illustrated by establishing the connection through a bus.

The input device 1103 may receive input numeric or character information, and generate key signal inputs related to user settings and function control of the electronic device configured to implement the method for translating the image or the method for training the image translation model, such as a touch screen, a keypad, a mouse, a trackpad, a touchpad, a pointing stick, one or more mouse buttons, trackballs, joysticks and other input devices. The output device 1104 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other. The server may be a cloud server, also known as a cloud computing server or a cloud host. It is a host product in the cloud computing service system, and solves the defect of difficult management and weak business scalability in traditional physical hosts and virtual private server (VPS) services.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A computer-implemented method for translating an image, comprising:
   obtaining an image translation request, the image translation request comprising an original image;
   obtaining a first target generator corresponding to a first domain to which a target translated image belongs, the first domain being carried in the image translation request;
   processing the original image using the first target generator to generate a pre-translated image, a mask image and a deformation parameter, wherein the pre-translated image, the mask image and the deformation parameter correspond to the original image;
   deforming the original image based on the deformation parameter to obtain a deformed image; and
   merging the deformed image, the pre-translated image and the mask image to generate the target translated image;
   wherein processing the original image using the first target generator to generate the pre-translated image, the mask image and the deformation parameter comprises:
   a. obtaining, using the first target generator, features of a target object included in the original image in a first domain;
   b. reconstructing, using the first target generator, the pre-translated image of the target object in a second domain based on the features of the target object in the first domain; and
   c. obtaining, using the first target generator, the mask image and the deformation parameter in a process of reconstructing the pre-translated image, wherein the deformation parameter is configured to deform the original image while reconstructing the pre-translated image;

wherein merging the deformed image, the pre-translated image and the mask image to generate the target translated image comprises:

for each pixel, determining, based on a pixel value of the pixel of the mask image, a first weight of a respective pixel of the pre-translated image and a second weight of a respective pixel of the deformed image; and merging, based on the first weight and the second weight, a pixel value of the respective pixel of the pre-translated image and a pixel value of the respective pixel of the deformed image, to generate the target translated image.

2. The computer-implemented method of claim 1, in a case that the first domain corresponds to a plurality of first generators, further comprising:

recognizing the original image to determine a second domain to which the original image belongs; and selecting the first target generator from the plurality of first generators based on the second domain and the first domain.

3. The computer-implemented method of claim 1, further comprising:

recognizing the original image to determine a second domain to which the original image belongs; and obtaining a second target generator corresponding to the second domain; and wherein processing the original image to generate the pre-translated image, the mask image and the deformation parameter comprises:

processing the original image using the second target generator to generate the pre-translated image, the mask image and the deformation parameter.

4. The computer-implemented method of claim 3, in a case that the second domain corresponds to a plurality of second generators, further comprising:

obtaining a first domain to which the target translated image belongs; and selecting the second target generator from the plurality of second generators based on the first domain and the second domain.

5. An electronic device, comprising:

at least one processor; and a storage device communicatively connected to the at least one processor;

wherein the storage device is configured to store instructions executable by the at least one processor, and when the instructions are executed by the at least one processor, the at least one processor is configured to:

obtain an image translation request, the image translation request comprising an original image;

obtain a first target generator corresponding to a first domain to which a target translated image belongs, the first domain being carried in the image translation request;

process the original image using the first target generator, to generate a pre-translated image, a mask image and a deformation parameter, wherein the pre-translated image, the mask image and the deformation parameter correspond to the original image;

deform the original image based on the deformation parameter to obtain a deformed image; and merge the deformed image, the pre-translated image and the mask image to generate the target translated image;

wherein the at least one processor is further configured to:

a. obtain, using the first target generator, features of a target object included in the original image in a first domain;

b. reconstruct, using the first target generator, the pre-translated image of the target object in a second domain based on the features of the target object in the first domain; and c. obtain, using the first target generator, the mask image and the deformation parameter while reconstructing the pre-translated image, wherein the deformation parameter is configured to deform the original image while reconstructing the pre-translated image;

wherein the at least one processor is further configured to:

for each pixel, determine, based on a pixel value of the pixel of the mask image, a first weight of a respective pixel of the pre-translated image and a second weight of a respective pixel of the deformed image; and merge, based on the first weight and the second weight, a pixel value of the respective pixel of the pre-translated image and a pixel value of the respective pixel of the deformed image, to generate the target translated image.

6. The electronic device of claim 5, wherein in a case that the first domain corresponds to a plurality of first generators, the at least one processor is configured to:

recognize the original image to determine a second domain to which the original image belongs; and select the first target generator from the plurality of first generators based on the second domain and the first domain.

7. The electronic device of claim 5, wherein the at least one processor is further configured to:

recognize the original image to determine a second domain to which the original image belongs; and obtain a second target generator corresponding to the second domain; and process the original image using the second target generator to generate the pre-translated image, the mask image and the deformation parameter.

8. The electronic device of claim 7, wherein, in a case that the second domain corresponds to a plurality of second generators, the at least one processor is further configured to:

obtain a first domain to which the target translated image belongs; and select the second target generator from the plurality of second generators based on the first domain and the second domain.

9. A non-transitory computer-readable storage medium, having computer instructions stored thereon, wherein when the computer instructions are executed by a processor, a computer-implemented method for translating an image is executed, the computer-implemented method comprising:

obtaining an image translation request, the image translation request comprising an original image;

obtaining a first target generator corresponding to a first domain to which a target translated image belongs, the first domain being carried in the image translation request;

processing the original image using the first target generator to generate a pre-translated image, a mask image and a deformation parameter, wherein the pre-translated image, the mask image and the deformation parameter correspond to the original image;

deforming the original image based on the deformation parameter to obtain a deformed image; and merging the deformed image, the pre-translated image and the mask image to generate the target translated image;

wherein processing the original image using the first target generator to generate the pre-translated image, the mask image and the deformation parameter comprises:
  a. obtaining, using the first target generator, features of a target object included in the original image in a first domain;
  b. reconstructing, using the first target generator, the pre-translated image of the target object in a second domain based on the features of the target object in the first domain; and
  c. obtaining, using the first target generator, the mask image and the deformation parameter while reconstructing the pre-translated image, wherein the deformation parameter is configured to deform the original image while reconstructing the pre-translated image;

wherein merging the deformed image, the pre-translated image and the mask image to generate the target translated image comprises:
  for each pixel, determining, based on a pixel value of the pixel of the mask image, a first weight of a respective pixel of the pre-translated image and a second weight of a respective pixel of the deformed image; and
  merging, based on the first weight and the second weight, a pixel value of the respective pixel of the pre-translated image and a pixel value of the respective pixel of the deformed image, to generate the target translated image.

* * * * *